United States Patent [19]
Raven

[11] Patent Number: 5,164,987
[45] Date of Patent: Nov. 17, 1992

[54] PERSONAL STEREO SPEAKER ASSEMBLY

[76] Inventor: Jay R. Raven, 5739 N. Eleventh Pl., Phoenix, Ariz. 85014

[21] Appl. No.: 779,403

[22] Filed: Oct. 17, 1991

[51] Int. Cl.⁵ ............................................. H04R 5/02
[52] U.S. Cl. ..................... 381/25; 381/183; 381/187; 381/68.5
[58] Field of Search ................. 381/25, 68.5, 183, 187

[56] References Cited

U.S. PATENT DOCUMENTS

| | | | |
|---|---|---|---|
| 1,354,524 | 10/1920 | Timmons | 381/183 |
| 3,588,384 | 6/1971 | Negley | 381/68.5 |
| 4,538,034 | 8/1985 | French | 2/209 |
| 4,683,587 | 7/1987 | Silverman | 381/25 |
| 4,864,619 | 9/1989 | Spates | 381/25 |
| 4,888,805 | 12/1989 | Karppala, Jr. | 381/25 |
| 4,901,355 | 2/1990 | Moore | 381/183 |

FOREIGN PATENT DOCUMENTS

| | | | |
|---|---|---|---|
| 0550708 | 3/1923 | France | 381/183 |
| 0103341 | 1/1917 | United Kingdom | 381/183 |

Primary Examiner—Forester W. Isen
Attorney, Agent, or Firm—Cahill, Sutton & Thomas

[57] ABSTRACT

A personal stereo speaker assembly adapted to be supported by the temple pieces of eyeglasses worn by the user includes a pair of sleeves adapted to receive respective temple pieces therein. Secured to and depending from each sleeve so as to at least partially cover an opening of the user's ears is an envelope preferably made from a natural or synthetic cloth or fiber such as cotton, canvas, or GoreTex. The envelopes are adapted to snugly enclose and support respective standard miniature speakers approximately at the ear openings. The speakers are operatively connected to a jack or plug by means of respective audio leads; the plug is adapted to connect to portable personal audio equipment such as radios and cassette players.

10 Claims, 2 Drawing Sheets

PERSONAL STEREO SPEAKER ASSEMBLY

BACKGROUND OF THE INVENTION

The present invention relates to a personal stereo speaker assembly adapted to be supported by the temple pieces of eyeglasses worn by the user.

Personal stereos, or miniature audio equipment such as radios and tape players, are typically carried on the person of the user. The sound from such personal stereos is heard by the user by means of earphones or ear pieces plugged into the miniature audio equipment by audio leads.

The most common earphones in use include a pair of ear pieces attached to opposite ends of a resilient metal or plastic band worn over the head of the user to properly position the ear pieces with respect to the ears of the user. These earphones have the disadvantage of being difficult to adjust to users having different size heads, are easy to dislodge if the user participates in strenuous physical activity, and are uncomfortable to wear for extended periods of time.

Other earphones are supported by various types of headgear worn by the user. For example, U.S. Pat. No. 4,538,034 to French, issued Aug. 27. 1985, discloses a bracket earphone assembly adapted to hook over user headgear such as goggles, a visor, or a headband. Also, U.S. Pat. No. 4,683,587 to Silverman, issued Jul. 28, 1987, discloses a submersible personal stereo in which ear plugs are attached by tubes to the back of a pair or goggles; by moving the tubes the ear plugs can be brought into alignment with and placed in the ears of the user. Finally, U.S. Pat. No. 4,864,619 to Spates, issued Sep. 5, 1989, discloses a fabric headband enclosing a stereo wiring system. Headphone speakers are detachably secured to the inside of the headband by conventional fabric securing tape such as Velcro, at the approximate location of the ears of the user.

Other types of earphones are supported on the temple pieces of eyeglasses worn by the user. See for example the following United States Patents.

| U.S. Pat. No. | Inventor | Issue Date |
| --- | --- | --- |
| 3,588,384 | Negley | 06/28/71 |
| 4,888,805 | Karppala, Jr. | 12/19/89 |
| 4,901,355 | Moore | 02/13/90 |

The patent to Negley shows a relatively complicated and bulky headset containing a microphone and earphone. The Negley headset is adapted to be attached by a clip to one eyeglass temple piece.

The patent to Karppala, Jr. shows a pair of bracket arms for supporting a pair of headphones in proximity to the user's ears. Part of each bracket arm is permanently fixed to one of the temple pieces of a pair of eyeglasses; the use of the Karppala, Jr. assembly permanently defaces the eyeglasses to which it is attached.

The patent to Moore discloses an assembly in which a pair of loops or clamps are connected to respective temple pieces of a pair of eyeglasses. Miniature speakers dangle from the loops or clamps by means of loops of the audio lead wire which connect the speakers to an audio source; the audio lead wires are also used to adjust the tension and maintain the speakers close to the user's head. However, use of the audio lead wire as support for the speakers and to adjust tension has several disadvantages. First, the dangling speakers are likely to swing from side to side, away from proximity to the ears, in response to the user's movements, thus decreasing the user's ability to hear sound from the speakers. Second, the weight of the dangling speakers are likely to damage the loops of audio leads. Third, the tension on the connection between the unprotected audio leads and the speakers is likely to damage the audio leads.

None of the prior art devices disclose a personal stereo speaker assembly adapted to be supported by the temple pieces of eyeglasses worn by the user, which provides superior sound quality to the user, which can be quickly positioned on or removed from the temple pieces without damage to the eyeglasses, and which provides protection to the audio lead wires.

SUMMARY OF THE INVENTION

It is an object of the present invention to provide a personal stereo speaker assembly which provides superior sound quality to the user.

It is another object of the present invention to provide a personal stereo speaker assembly adapted to be supported by the temple pieces of eyeglasses worn by the user, which assembly can be quickly positioned on or removed from the temple pieces without damage to the eyeglasses.

It is another object of the present invention to provide a personal stereo speaker assembly which provides protection to the audio lead wires connecting the speakers to audio equipment.

Briefly described, and in accordance with one embodiment, the invention provides a personal stereo speaker assembly adapted to be supported by the temple pieces of eyeglasses worn by the user. The assembly includes a pair of sleeves adapted to receive respective temple pieces therein. Secured to and depending from each sleeve is an envelope at least partially covering an opening of the user's ears. The envelopes, preferably made from a natural or synthetic cloth or fiber such as cotton, canvas, or GoreTex, are adapted to snugly enclose and position respective standard miniature speakers approximately at the ear openings. The speakers are operatively connected to a jack or plug by means of respective audio leads; the plug is adapted to connect to portable personal audio equipment such as radios and cassette players.

DETAILED DESCRIPTION OF THE PREFERRED EMBODIMENTS

Figure 1:
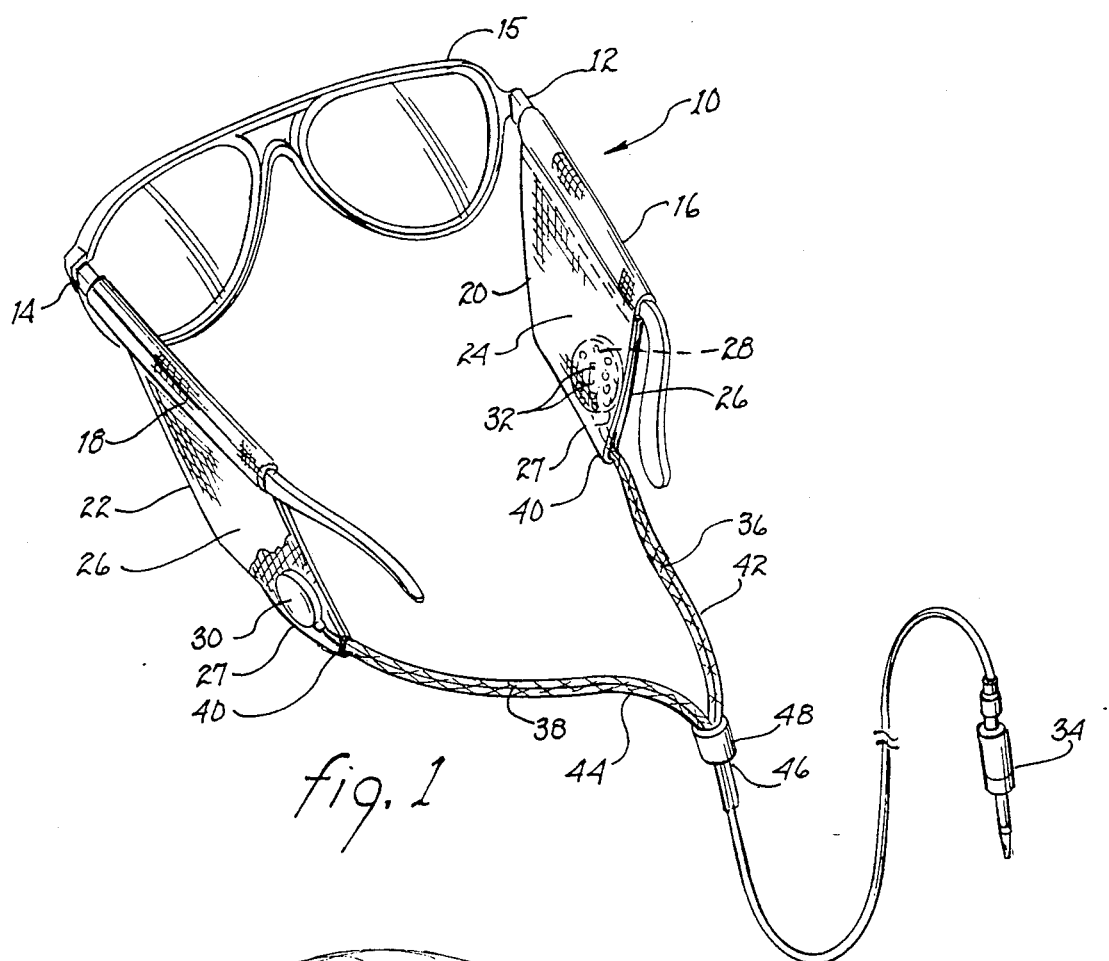
FIG. 1 is a perspective view of a first embodiment of the personal stereo speaker assembly of the present invention.
Figure 2:
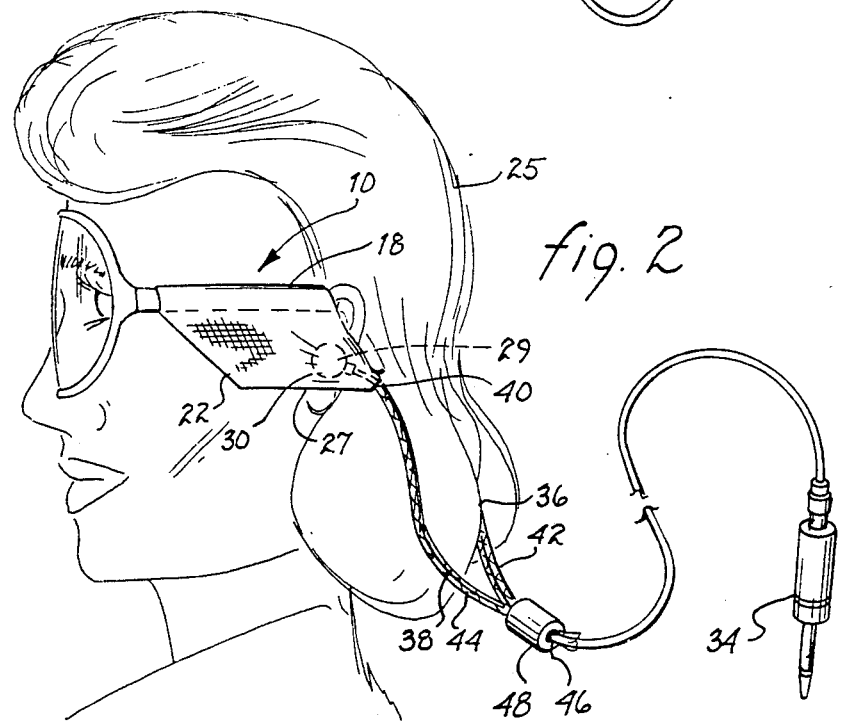
FIG. 2 illustrates the use of the personal stereo speaker assembly shown in FIG. 1.

FIGS. 1 and 2 show one embodiment of the personal stereo speaker assembly 10 of the present invention supported by temple pieces 12 and 14 of eyeglasses 15. Assembly 10 comprises a pair of sleeves 16 and 18 adapted to receive respective temple pieces 12 and 14 therein. Secured to and depending respectively from sleeves 12 and 14 are soft, flexible envelopes 20 and 22 preferably made from a natural or synthetic cloth or fiber such as cotton, canvas, or GoreTex. Envelopes 20 and 22 each include an inner side 24 adjacent to the user's head 25, and an outer side 26; a portion of each envelope, for instance, corners 27, is adapted to at least partially cover the openings 29 of the user's ears.

Corners 27 of envelopes 20 and 22 are adapted to enclose within and support respective standard miniature speakers 28 and 30 approximately at the ear openings 29. Inner sides 24 of corners 27 contain means for enhancing listening capability, such as perforations 32, at a location corresponding to the location of the speakers; special fabric such as that used to cover the face of full-size speakers could be used in place of the perforations to enhance listening. Speakers 28 and 30 are operatively connected to a jack or plug 34 by means of respective audio leads 36 and 38 which exit corners 27 at openings 40; the plug is adapted to connect to portable personal audio equipment (not shown) such as radios and cassette players.

To protect audio leads 36 and 38 from wear and damage, it is preferable to enclose each of the leads in respective cords or lanyards 42 and 44; the two lanyards together are threaded through an orifice 46 in a bead 48 which bead can be moved up or down on the lanyards as desired. If bead 48 is moved upwards on lanyards 42 and 44, assembly 10 is drawn closer to the user's head, consequently drawing envelopes 20 and 22, and speakers 28 and 30, closer to the user's ears; the cloth or fiber envelopes provide a smooth comfortable surface against the user's head and ears which serves to block out ambient noise, thus improving the apparent quality of the sound heard from the speakers. The soft surfaces of envelopes 20 and 22 are more comfortable to the user than the metal and/or plastic speaker mounting means of the prior art speaker assemblies, which tend to scratch the user or catch in the user's hair.

Figure 3:
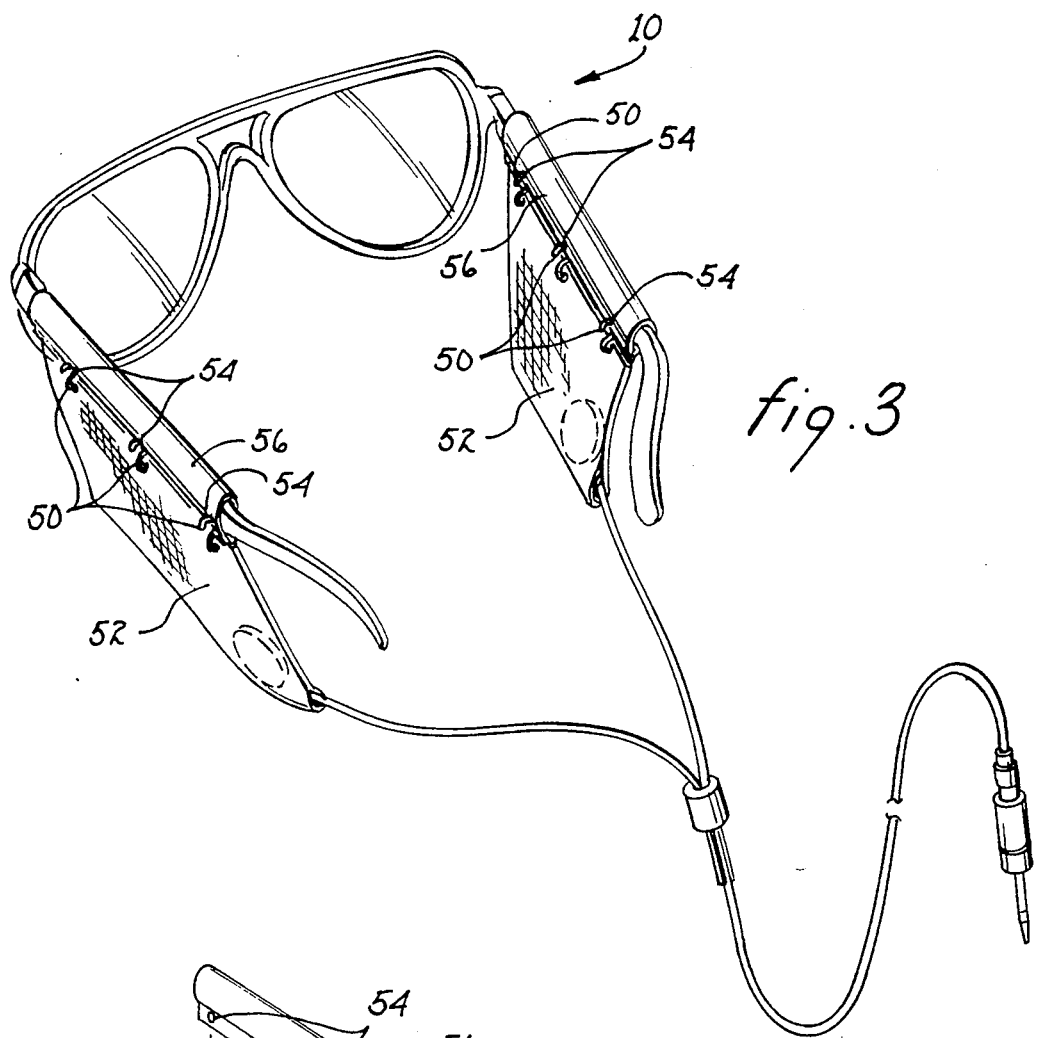
FIG. 3 is a perspective view of a second embodiment of the personal stereo speaker assembly of the present invention.
Figure 4:
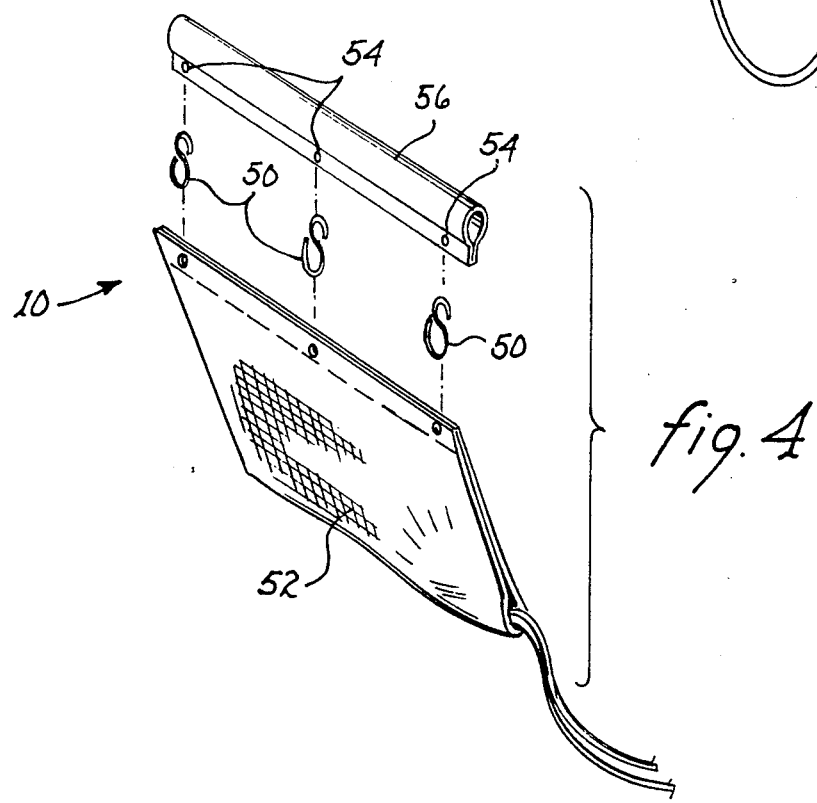
FIG. 4 is an exploded view of the sleeve and envelope of FIG. 3.

Each sleeve and envelope pair (i.e., in FIG. 1, sleeve 16/envelope 20 and sleeve 18/envelope 22) can be fashioned from one piece of cloth or fiber by stitching a seam to form a sleeve from the envelope, as shown in FIG. 1. Alternatively, as shown in FIGS. 3 and 4, hooks 50 can be sewed onto or otherwise attached to each of a pair of preformed envelopes 52, which hooks can then be hooked into corresponding orifices 54 on respective preformed sleeves 56, or vice versa; that is, the hooks could be attached to the sleeves, and the corresponding orifices could be located on the envelopes.

In either embodiment, assembly 10 can be easily and quickly placed on or removed from eyeglasses 15, without marring or disfiguring the eyeglasses, by sliding the sleeves on or off of temple pieces 12 and 14. When assembly 10 is placed on temple pieces 12 and 14, speakers 28 and 30 will automatically be positioned adjacent the ears of the user without the need for further manipulation or adjustment.

While the invention has been described with reference to several particular embodiments thereof, those skilled in the art will be able to make various modifications to the described embodiments of the invention without departing from the true spirit and scope of the invention. For example, the envelopes can have a variety of shapes to suit fashion dictates or individual preferences. Thus, it is to be understood that the present invention is not limited to the particular construction and arrangement of parts disclosed and illustrated herein, but embraces all such modified forms thereof which are within the scope of the following claims.

I claim:

1. A personal stereo speaker assembly for positioning speakers adjacent to the ears of a user wearing a pair of eyeglasses having temple pieces, said assembly comprising, for each of said temple pieces of said pair of eyeglasses worn by the user:
   a. a sleeve adapted to receive one of said temple pieces therein;
   b. a soft flexible envelope secured to and depending from said sleeve and positioned so that a part of the envelope at least partially covers the opening of an ear of the user;
   c. a speaker enclosed within said envelope so as to position the speaker approximately at the ear opening; and
   d. a flexible audio lead operatively connected to the speaker and extending outwardly of said envelope for connection to an audio source.

2. The personal stereo speaker assembly of claim 1, wherein the sleeve and envelope are made from one piece of cloth selected from the group consisting of cotton, canvas, and GoreTex, and the sleeve is formed from the envelope by stitches extending along a side of said piece of cloth.

3. The personal stereo speaker assembly of claim 1, further comprising hooks attached to the envelope, which hooks are adapted to hook into corresponding orifices located in the sleeve, thereby securing the envelope to the sleeve.

4. The personal stereo speaker assembly of claim 2, further comprising a lanyard enclosing the audio lead so as to protect it from damage.

5. The personal stereo speaker assembly of claim 2, the envelope further comprising inner and outer sides, wherein the inner side is adjacent to the user's ear and contains perforations to facilitate the transfer of sound from the speaker to the user.

6. A personal stereo speaker assembly for positioning speakers adjacent to the ears of a user wearing a pair of eyeglasses having temple pieces, said assembly comprising:
   a. a pair of sleeves, each of which is adapted to receive a temple piece therein;
   b. a pair of soft flexible envelopes, each of which is secured to and depends from a respective sleeve, and each of which is positioned so as to at least partially cover the openings of the user's ears;
   c. a pair of speakers, each of which is enclosed within a respective envelope so as to position the speakers at approximately the ear openings; and
   d. flexible audio leads operatively connected to the speakers and extending outwardly of said envelopes for connection to an audio source.

7. The personal stereo speaker assembly of claim 6, wherein each sleeve and envelope are made from one piece of cloth selected from the group consisting of cotton, canvas, and GoreTex, and each sleeve is formed from a respective envelope by stitches extending along a side of said piece of cloth.

8. The personal stereo speaker assembly of claim 7, further comprising lanyards enclosing the audio leads so as to protect them from damage and a bead having an opening adapted to receive the lanyards therein so that the bead can slide on the lanyards, thereby adjusting the fit of the assembly on the user.

9. The personal stereo speaker assembly of claim 7, the envelopes further comprising inner and outer sides, wherein the inner sides are adjacent to the user's ear and contain perforations to facilitate the transfer of sound from the speaker to the user.

10. A method for positioning speakers adjacent to the ears of a user wearing a pair of eyeglasses having temple pieces, the method comprising:
   a. positioning each one of a pair of sleeves on a respective temple piece;
   b. securing each of a pair of soft flexible envelopes from a respective sleeve so that each envelope depends from a respective sleeve and at least partially covers the ear opening of the user;
   c. enclosing within each envelope one of a pair of speakers so that the speakers are positioned approximately at the user's ear openings; and
   d. operatively connecting the speakers with an audio source.

* * * * *